Patented Apr. 30, 1929.

1,711,027

UNITED STATES PATENT OFFICE.

EMIL LUZZATTI, OF VINELAND, AND HARRY M. SCHLOSS, OF JERSEY CITY, NEW JERSEY.

CINDER BLOCK AND PROCESS OF MAKING THE SAME.

No Drawing. Application filed March 31, 1927. Serial No. 180,641.

Our invention relates to improvements in cinder blocks, bricks, slabs, and other structures and the process of making the same, and more particularly has reference to a composition block adapted for building purposes, comprising ground or crushed cinders of predetermined size, together with ground clam or oyster shell, the whole combined with suitable proportions of cement and water with or without other ingredients, the object being to provide a cheap, strong, building block preferably having one or more surfaces rough or uneven, adapted to provide suitable anchorage or base for plaster, stucco, or the like, the block being adapted to permit of the penetration of nails or spikes for furring, lathing, or other purposes.

It is well known that cinders and ashes have been used in the manufacture of building blocks, and that cinders reduced to about three-quarters of an inch in size have been used for that purpose, as set forth in the patent to Straub, #1,212,840, but in that case both cinders and ashes are taken without separation, and as they come from the furnace and are combined with cement and water in the block, whereas we have found that a much better block can be made by reducing the cinders to from about 1/16 to 1/4 of an inch in size, eliminating the ashes, and preferably combining therewith finely ground oyster or clam shell, following the steps substantially hereinafter set forth. A block thus formed not only has superior adhesive properties, but is more uniform, and ingredients thus arranged, facilitate a more thorough mixture, producing a stronger mass, while at the same time containing sufficient porosity, lightness, and density to render the block more perfectly adapted for building purposes. While the ground or broken clam or oyster shells, or similar material is preferably reduced to powder form, the same may of course be less finely subdivided, and may be mixed with other materials, if desired.

In producing the blocks, hard or soft coal cinders, as may be preferred for given uses, are preferably first screened, or if desired, may be crushed and then screened to eliminate all ashes and particles smaller than about 1/16 to 1/4 of an inch in size. A second screening will then eliminate any larger particles or foreign matter. The oyster and clam shells are preferably separately ground to a much finer consistency, and the proportion thereof relative to the amount of cinders may be varied according to the particular uses for which the blocks are intended. For general use, about 1/4 to 1/3 of shell or lime, to the bulk of cinder, is preferably employed. To three bags or units of ground cinder and shell, as above specified, is preferably mixed about one bag or unit of cement, after the same has first been thoroughly sprinkled with water to moisten the same. From the mixer this material is now discharged into moulds of conventional form, comprising planks at the bottom with drop sides, and the same are successively introduced for compression in the moulds, where the mixture is pounded, and compressed with several tons pressure. The sides of the moulds are now removed, and the planks supporting the moulded blocks are now stacked upon cars, or otherwise, and are now placed in a heating chamber, preferably comprising a brick or block structure having suitable entrance and exit doors, and otherwise entirely enclosed, and through which steam piping is passed. After the chamber has been closed, live steam at a pressure of about fifteen pounds or upwards is admitted, and the blocks remain in this chamber from about eighteen to twenty-four hours, during which period some free steam is permitted to circulate. This moistened and heated condition of the air retards the setting of the blocks, and at the same time supplies sufficient heat, and the desired amount of additional water for driving off the carbonic acid gas and setting the composition. From the heating and steam chamber, the blocks are conveyed out into the open where they stand preferably from eight to fifteen days before being actually used.

Blocks, bricks, lentels, chimney tops, copings, slabs, and other forms thus produced will be found to resist high degree of compression, to be uniform in shape, not likely to crack or break off at the corners, light in weight, and more penetrable by nails, etc., than the conventionally made cement block. Where the ground shell is not employed, the block is still lighter, but due to the changes and conversions taking place during the heat treatment, the application of the ground shell has been found of considerable advantage for many uses, and gives a denser and smoother outer surface to the block. Where coloring effects are required, a little clay may also be mixed, or other preferably mineral material, due regard being had for the correct proportioning and proper amount of water for securing the best binding properties.

Where a rough surface is desired, as for the direct application of stucco or plastics, instead of moulding the block upon a plank, the same may be moulded upon a rough surface, previously dusted with talc or other suitable material to prevent adhesion, or porous material such as broken stone, broken brick, or loose cinders may first be sprinkled on the plank so that the face of the block formed adjacent the same will retain the broken material, leaving cavities and an irregular surface to which the plastic or stucco may be readily attached. It also follows that the moulds may be provided with removable partitions so that the cement of different densities may be simultaneously moulded, for instance, a very fine dense mixture may be introduced in the central section, and less dense and more penetrable mixtures in either or both of the outer sections, after which the partitions may be removed, and the entire mass compressed, so that in the final product, the inner and outer faces of the block may be of less density than the central or core section thereof, thus facilitating the penetration of nails in the outer surface while retaining a dense, substantially non-porous central section.

Of course it will be understood that various modifications may be made in the proportions, ingredients, and in the manner of mixing the same without departing from the spirit of the invention as claimed.

We claim :—

1. A composition building block of the class described consisting of about three parts of ground material, about one part cement, and sufficient water to bind, the ground material comprising cinders of about 1/16 to 1/4 of an inch in size and finely ground shell or lime in the proportion of about 1/4 of the shell to about 3/4 of the cinder.

2. The method of producing building blocks substantially as set forth in claim 1, consisting in moulding the same into building blocks, applying part of the water prior to the moulding of the same, thereafter heating the moulded block in a steam chamber with sufficient free steam to complete the setting of the block.

3. The method of producing building blocks substantially as set forth in claim 1, consisting in moulding the same into building blocks, applying part of the water prior to the moulding of the same, thereafter heating the moulded block in a steam chamber with sufficient free steam to complete the setting of the block, and thereafter exposing the block thus formed in the open air preliminary to using the same.

In testimony whereof we hereunto affix our signatures.

EMIL LUZZATTI.
HARRY M. SCHLOSS.